United States Patent [19]

Sato

[11] Patent Number: 5,934,246
[45] Date of Patent: Aug. 10, 1999

[54] INTAKE AND EXHAUST METHOD FOR ACHIEVING LEAN COMBUSTION IN AN ENGINE

[76] Inventor: Jun Sato, 2607 W. Carson St., Torrance, Calif. 90503

[21] Appl. No.: 09/002,525

[22] Filed: Jan. 5, 1998

[51] Int. Cl.$^6$ ................................................ F02B 31/00
[52] U.S. Cl. ................................................ 123/308
[58] Field of Search ................................ 123/306, 308, 123/432

[56] References Cited

U.S. PATENT DOCUMENTS

| | | | |
|---|---|---|---|
| 4,959,961 | 10/1990 | Hiereth | 123/432 |
| 5,065,711 | 11/1991 | Lesley | 123/308 |
| 5,065,712 | 11/1991 | Hundleby | 123/308 |
| 5,165,374 | 11/1992 | Chapman et al. | 123/308 |
| 5,205,259 | 4/1993 | Clarke et al. | 123/308 |
| 5,365,900 | 11/1994 | Farnlund et al. | 123/308 |
| 5,429,086 | 7/1995 | Glackin | 123/308 |
| 5,515,827 | 5/1996 | Rutschmann et al. | 123/432 |
| 5,645,029 | 7/1997 | Ohsuga et al. | 123/306 |
| 5,669,347 | 9/1997 | Cullen et al. | 123/308 |

*Primary Examiner*—Erick R. Solis
*Attorney, Agent, or Firm*—Lyon & Lyon LLP

[57] ABSTRACT

An intake and exhaust system for use with lean-burn combustion engines includes a first intake port and a second intake port that transfer a fuel-air mixture to a combustion chamber within a cylinder. At least one exhaust port allows combustion gases to exit the combustion chamber. Preferably, in the intake and exhaust system, a first exhaust port and a second exhaust port are located on diagonally opposite sides of the cylinder. The first intake port preferably transfers a fuel-air mixture to the combustion chamber in a direction opposite of the second intake port. When two exhaust ports are used, it is preferable that the first exhaust port transfers gas outside of the combustion chamber in a direction opposite of the second exhaust port. The location of the input and exhaust ports creates a strong swirl under a range of loads.

17 Claims, 14 Drawing Sheets

INTAKE AND EXHAUST METHOD FOR ACHIEVING LEAN COMBUSTION IN AN ENGINE

BACKGROUND OF THE INVENTION

Field of the Invention

The field of the invention is internal combustion engines.

Engines have been developed that operate using a lean-burn system wherein the air component of the fuel-air mixture is increased by increasing the air intake flow into the cylinder. By increasing the air component of the fuel-air mixture, the efficiency and power of the engine are improved. Consequently, by increasing the quantity of air, not only is the power output increased, but the fuel consumption is reduced, thereby improving gas milage.

Typically, during an intake stroke of an internal combustion engine, a mixture of fuel and air is introduced into an engine cylinder After the intake stroke, the compression stroke commences, thereby compressing the mixture of fuel and air within the cylinder. A spark plug typically ignites the fuel-air mixture within the cylinder to provide power via the piston located within the cylinder. An exhaust stroke removes the burned fuel and air mixture from the engine cylinder in anticipation of the next intake stroke.

Generally, as the fuel-air mixture is compressed, the mixture of fuel and air near the spark plug electrode is richer, or thicker than the surrounding gases. When the electrode of the spark plug discharges, the region containing the thicker mixture of fuel and air is the first to ignite. The flame then travels outward, along the inner surface of the combustion chamber where the mixture is thinner, i.e., leaner. Finally, the flame spreads to the main area of the combustion chamber, where the mixture of fuel and air is leanest.

Unfortunately, this mixture of fuel and air in the main combustion chamber takes longer than desired to finish burning. This problem is particularly acute when a lean fuel mixture is used in the engine. This is so because the fuel particles in the lean fuel-air mixture are located at further distances from one another than in normal fuel mixture conditions. Consequently, in a typical engine using a lean fuel-air mixture, the thermal efficiency is lowered because of slow flame propagation and combustion within the cylinder.

Attempts have been made to prevent this situation from occurring by modifying the flow of the fuel-air mixture. To this end, various mechanisms have been developed that are incorporated into the intake system to add a strong swirl to the intake fuel-air mixture. Since the individual particles in lean-burn systems are separated from one another by large comparative distances, it is preferable to force the particles toward one another by actively moving the particles. By adding a strong swirl in the cylinder to the fuel-air mixture, a homogenization of the fuel-air mixture is accomplished.

By adding a strong swirl to the combustion chamber, the distances between fuel particles decreases. The decreased particle distances and the increased particle motion caused by the strong swirl increases the flame propagation speed. In addition, filing efficiency is increased by adding a swirl to the cylinder.

Various designs have been attempted in combustion engine intake systems to increase turbulence within the cylinder. For example, automobile manufacturers have used two intake ports and two valves, where one valve is partially closed to generate a swirl within the cylinder. Unfortunately, these methods have had deleterious side effects on engine performance, such as strong intake resistance, pumping loss, and lower filling efficiency. Moreover, these methods are able to generate a strong swirl only under low-load conditions when used within a four-valve structure. Accordingly, there is a need for a multi-valve intake and exhaust system that increases flame propagation speeds, improves intake and exhaust efficiency, and permits the formation of swirls within the cylinder over the entire revolution range without swirl interference.

SUMMARY OF THE INVENTION

The present invention is directed to an intake and exhaust method for achieving lean combustion in an engine.

In a first separate aspect of the present invention, a first intake port is connected to a cylinder within the engine. A second intake port is connected to the cylinder so as to be diagonally opposite the first intake port. At least one exhaust port permits combustion gases to exit the cylinder. The arrangement provides for the creation of strong swirl within the cylinder during an intake and exhaust stroke.

In a second separate aspect of the present invention, a combustion engine includes at least one cylinder and a first intake port connected to the cylinder, the intake port transfers a fuel-air mixture into the at least one cylinder in a first direction. A second intake port also connects to the at least one cylinder and diagonally opposes the first intake port. The second intake port connects to the cylinder and transfers the fuel-air mixture into the cylinder in a second direction opposite to the first direction so as to create a swirl during an intake stroke. At least one exhaust port is located in the at least one cylinder. In addition to creating a strong swirl within the cylinder, filling efficiency is increased, as well as the mechanical octane rating of the engine.

Accordingly, it is an object of the present invention to provide an improved intake and exhaust method for achieving lean combustion. Other and further objects and advantages will appear hereinafter.

DETAILED DESCRIPTION OF THE PREFERRED EMBODIMENT

Turning now in detail to the drawings, FIGS. 1(a), 1(b), 1(c), 2(a), 2(b), and 2(c) schematically show a conventional design for an internal combustion engine that includes a cylinder 10 and associated piston 12. Located at the upper portion of the cylinder is an intake port 14 and an exhaust port 16. Both the intake port 14 and exhaust port 16 each have a slidable valve 18 that moves axially within the intake and exhaust ports 14 and 16 to open and close an orifice 20 leading into the cylinder 10.

Figure 1:
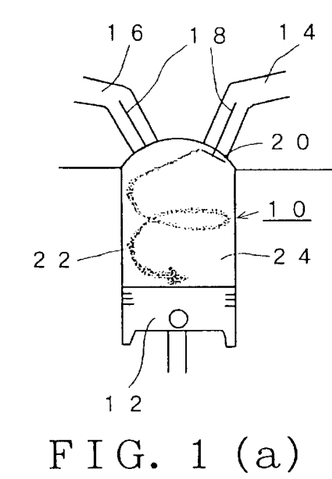
FIG. 1(a) is a schematic view of a cylinder and associated piston.
FIG. 1(b) is a schematic view of a cylinder and associated piston.
FIG. 1(c) is a schematic view of a cylinder and associated piston.
Figure 2:
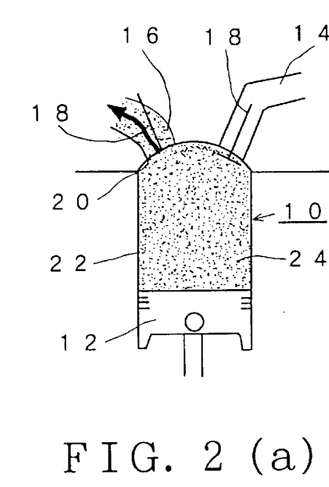
FIG. 2(a) is a schematic view of a cylinder and is associated piston.
FIG. 2(b) is a schematic view of a cylinder and associated piston.
FIG. 2(c) is a schematic view of a cylinder and associated piston.

Still referring to FIGS. 1(a), 1(b), 1(c), 2(a), 2(b), and 2(c), the operation of a lean-burn system within a conventional two-valve engine will now be described. During the intake stroke, as shown in FIG. 1(a), the intake valve 18 within intake port 14 opens while the piston 12 travels downward in the cylinder 10, thereby permitting a lean fuel-air mixture 22 to flow into the cylinder 10. The lean fuel-air mixture 22 enters the cylinder 10 in a circling fashion, traveling along the walls of the cylinder 10.

After completion of the intake stroke, the compression stroke begins. As can be seen from FIGS. 1(b) and 1(c), the intake valve 18 within intake port 14 closes and the piston 12 moves upward along the cylinder 10. The lean fuel-air mixture 22 rises, swirling along the wall of the cylinder 10, and gathers in the main combustion chamber 24 as the mixture is progressively compressed. As the piston 10 nears the top-dead center of the compression stroke, e.g., as seen in FIGS. 1(c), further compression causes the lean fuel-air mixture 22 to thicken or get richer.

Figure 14:
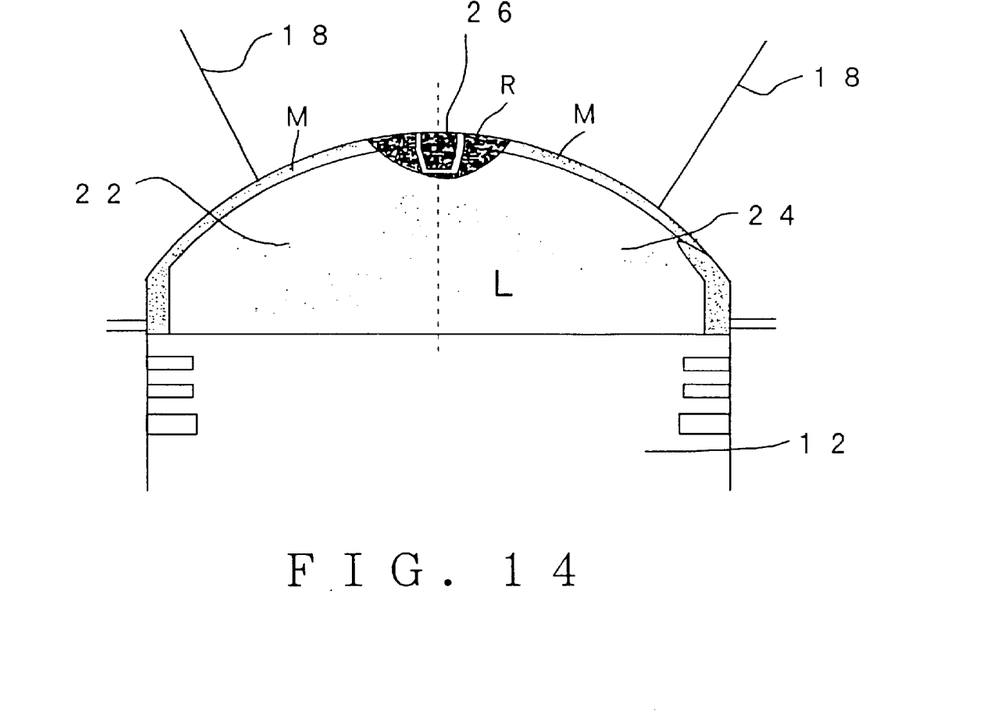
FIG. 14 is a schematic view of a cylinder illustrating the fuel-air mixture at dead-center compression when a relatively rich fuel-air mixture is employed.

Referring momentarily to FIG. 14, a graphic distribution of the fuel-air mixture 22 within the main combustion chamber 24 is shown when a relatively rich fuel-air mixture is employed. Generally, in the main combustion chamber 24 there are three regions of fuel-air mixtures. In region R, the fuel content is high, creating a thick, rich mixture. Along the top surface of the main combustion chamber 24 is region M, wherein the fuel content is relatively high, but still not as rich as the R region. Still further is the region L, which is the leanest of the three, i.e., it has the lowest fuel content.

Figure 15:
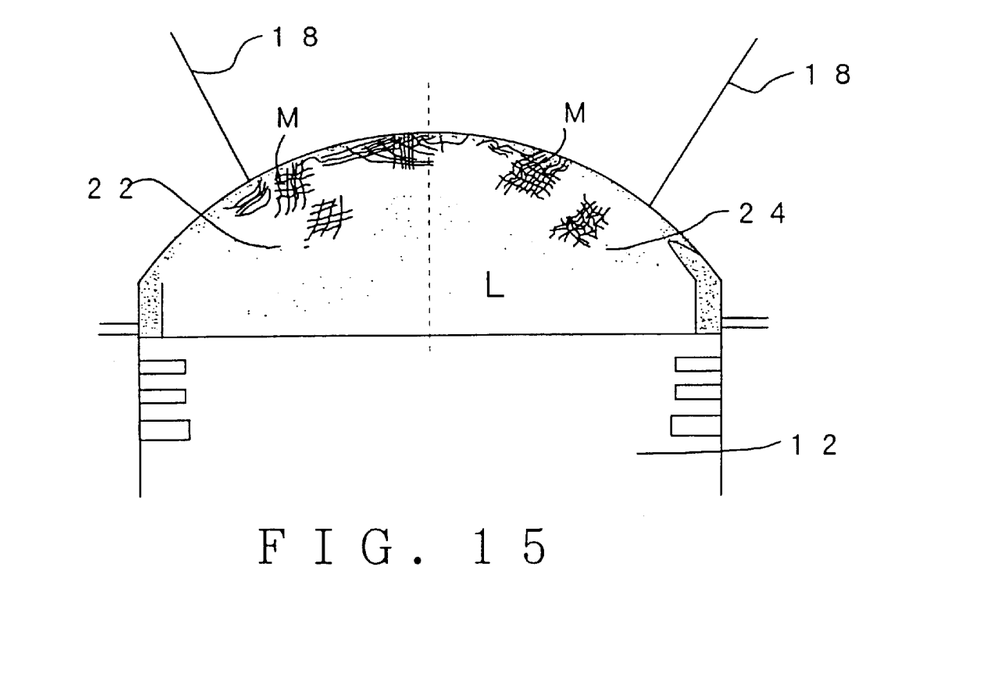
FIG. 15 is a schematic view of a cylinder illustrating the fuel-air mixture at dead-center compression when a relatively lean fuel-air mixture is employed.

However, FIG. 15 shows a graphic distribution of the fuel-air mixture 22 within the main combustion chamber 24 when a lean fuel-air mixture 22 is used. As can be seen by FIG. 15, only regions M and L develop in the main combustion chamber. Noticeably absent is a rich R region that fails to form near the apex of the main combustion chamber 24.

When the fuel-air mixture 22 is particularly lean, i.e., when used in lean-burn systems, the stratification of fuel within the combustion chamber 24 poses significant problems for the combustion of the fuel-air mixture 22. For example, the fuel particles present within a lean fuel-air mixture 22 are located at further distances from one another than during normal mixture conditions. As a result, there is little or no formation of a rich R region near the ignition point of the spark plug 26. Ignition of the fuel-air mixture 22 becomes problematic. In addition, flame propagation is slower in the combustion chamber 24.

During such lean-burn conditions, it is preferable to fluidize, or homogenize the fuel-air mixture 22 to actively decrease the distances between fuel particles within the fuel-air mixture 22. The active mixing of the stratified layers of fuel within combustion chamber 24 increases the speed of flame propagation. To this end, it advantageous to actively induce a swirling motion into the cylinder combustion chamber 24.

Figure 3:
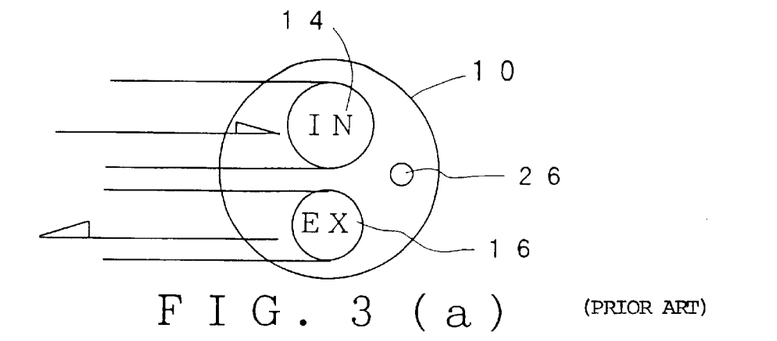
FIG. 3(a) is a schematic view of the positions of the intake and exhaust port on a cylinder according to the prior art.
FIG. 3(b) is a schematic view of the positions of the intake and exhaust ports on a cylinder according to the prior art.
FIG. 3(c) is a schematic view of the positions of the intake and exhaust ports on a cylinder according to the prior art.

FIGS. 3(a), 3(b), and 3(c) show various attempts at inducing a swirl into the combustion chamber 24 of a cylinder 10 to aid in mixing the fuel-air mixture 22. FIG. 3(a) illustrates the use of one intake port 14 and one exhaust port 16 where the exhaust flows out in the same direction as the intake flow. This design produces turn flow, i.e., a horizontal swirl state within the combustion chamber 24 of a cylinder 10. FIG. 3(b) illustrates the use one intake port 14 and one exhaust port 16, where the intake flows from one direction and the exhaust exits the cylinder 10 in the same direction to produce a cross flow pattern within the combustion chamber 24.

FIG. 3(c) illustrates the use of a intake and exhaust system incorporating two intake ports 14 and two exhaust ports 16. Both intake ports 14 enter into the combustion chamber 24 from the same direction. Similarly, both exhaust ports 16 exit the combustion chamber 24 in the same direction. In this design, however, there is unnecessary interference with the fuel-air mixture entering the combustion chamber 24. In particular, the fuel-air mixture 22 entering the combustion chamber 24 tends to collide at a position α near the exhaust ports 16. In addition, in the four valve design of FIG. 3(c), one of the intake ports 14 is almost completely closed by the valve 18. Consequently, there is a strong intake resistance in combustion engines incorporating this design. This results in a significant amount of pumping loss. Moreover, such four valve designs have low filling efficiencies.

It is also important to note that all of the designs shown above are able to generate a sufficient swirl only under low-load conditions and not over the entire range of loads commonly experienced in combustion engines. As a result, these prior designs are unable to sufficiently concentrate the fuel-air mixture 22 near the ignition point of a spark plug 26.

Figure 4:
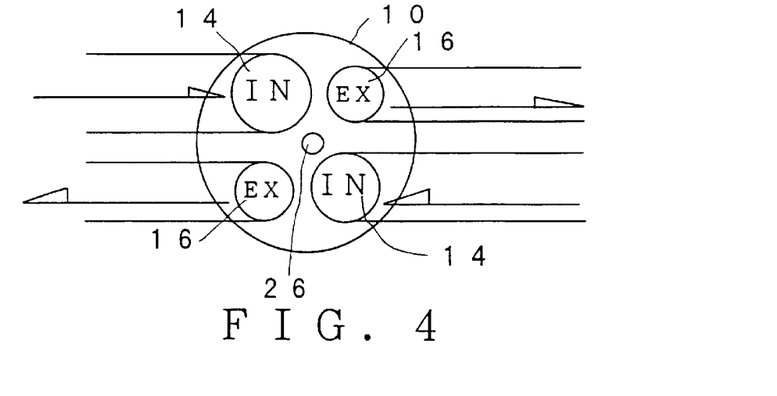
FIG. 4 is a schematic view of the positions of the intake and exhaust ports on a cylinder in a first embodiment.

FIG. 4 illustrates the intake and exhaust port structure according to one embodiment of the present invention. In the preferred embodiment, there are at least two intake ports 14 and at least one exhaust port 16. Preferably, there are two intake ports 14 and two exhaust ports 16. The two intake ports 14 leading to the combustion chamber 24 are advantageously located on diagonally opposing sides of the cylinder. The description of diagonally opposing sides is meant to indicate the geometry where a first port and an opposing port reside on opposing sides of a cylinder 10 and the opposing port lies on a diagonal to the direction of the flow of gases through the port. Preferably, the two intake ports 14 are substantially symmetrical about a plane passing through the center axis of the cylinder 10.

In a similar fashion, the exhaust ports 16 are advantageously located on diagonally opposing sides of the cylinder. Preferably, the two exhaust ports 16 are substantially symmetrical about a plane passing through the center axis of the cylinder 10.

Figure 5:
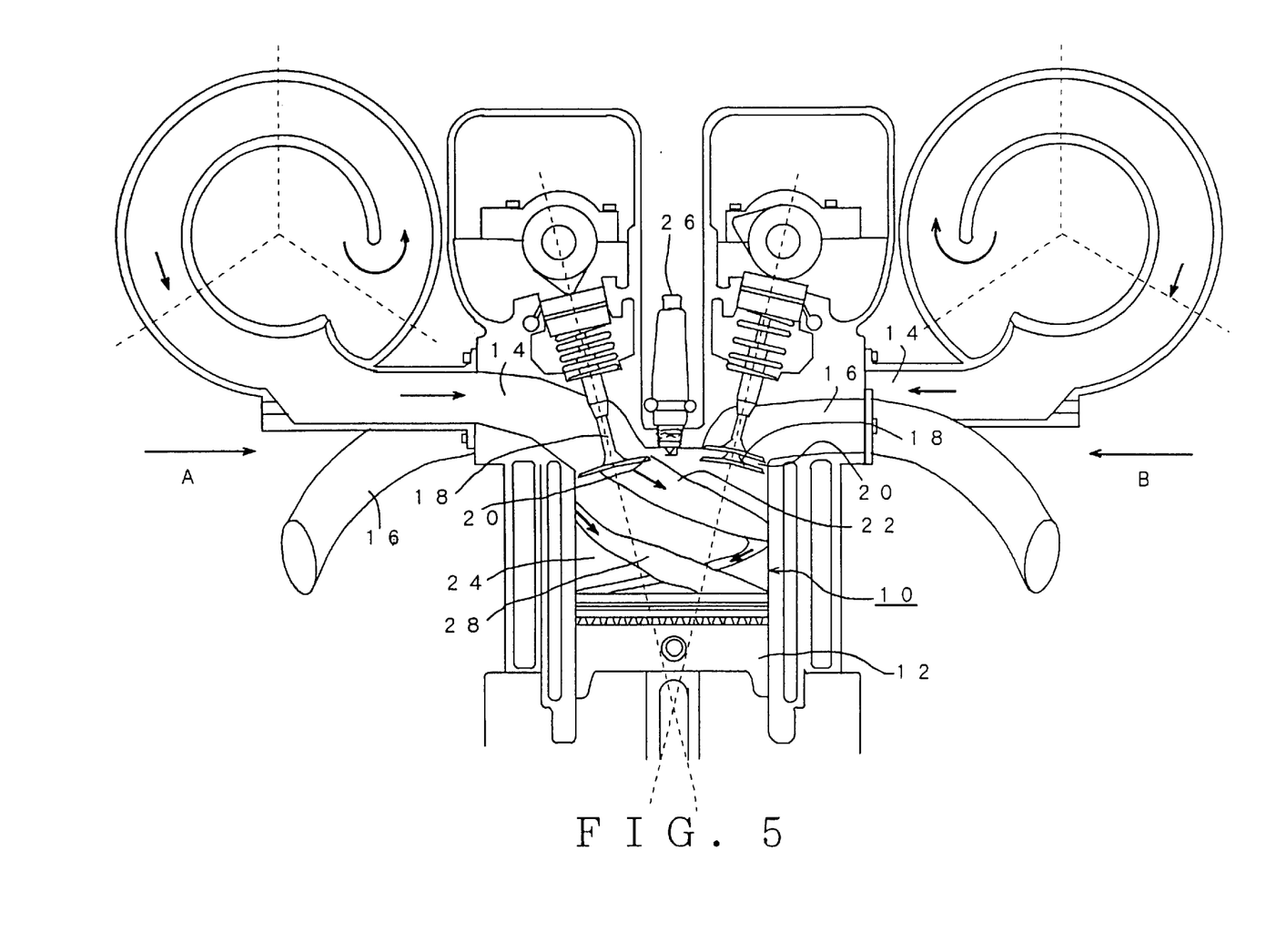
FIG. 5 is a cross-sectional view of a cylinder with intake and exhaust ports during the intake stroke.

The flow directions of the gases into and out of the respective intake and exhaust ports 14 and 16, are particularly important. Preferably, the fuel-air mixture 22 flowing through a first intake port 14 travels in the direction of arrow A as shown in FIG. 5. In contrast, with reference to the same FIG. 5, the fuel-air mixture 22 flowing through the second intake port 14 preferably travels in an opposing manner, in the direction of arrow B. Similarly, the exhaust gases exiting the exhaust ports 16 travel in opposing directions. For, example, it is preferable that the combustion gases exiting a first exhaust port 16 travel in the direction of arrow A as shown in FIG. 5. In contrast, with reference to the same FIG. 5, the combustion gases exiting the second exhaust port 16 preferably travel in the direction of arrow B.

In addition, the two intake ports 14 are advantageously arranged so as to be laterally adjacent a spark plug 26 positioned within the center region of the cylinder 10. The central positioning of the spark plug 26 advantageously increases the speed of flame propagation, thereby allowing complete combustion to occur within a short period of time. The central spark plug 26 also increases the mechanical octane rating of the engine, permitting higher compression ratios.

The geometric positioning of the intake ports 14 and exhaust ports 16 advantageously permits a strong swirl 28 to be generated in the combustion chamber 24 over the entire load range without a commensurate reduction in the filling efficiency or pumping loss. The arrangement avoids the problem of interference of the two input ports streams that was common in other designs.

Figure 16:
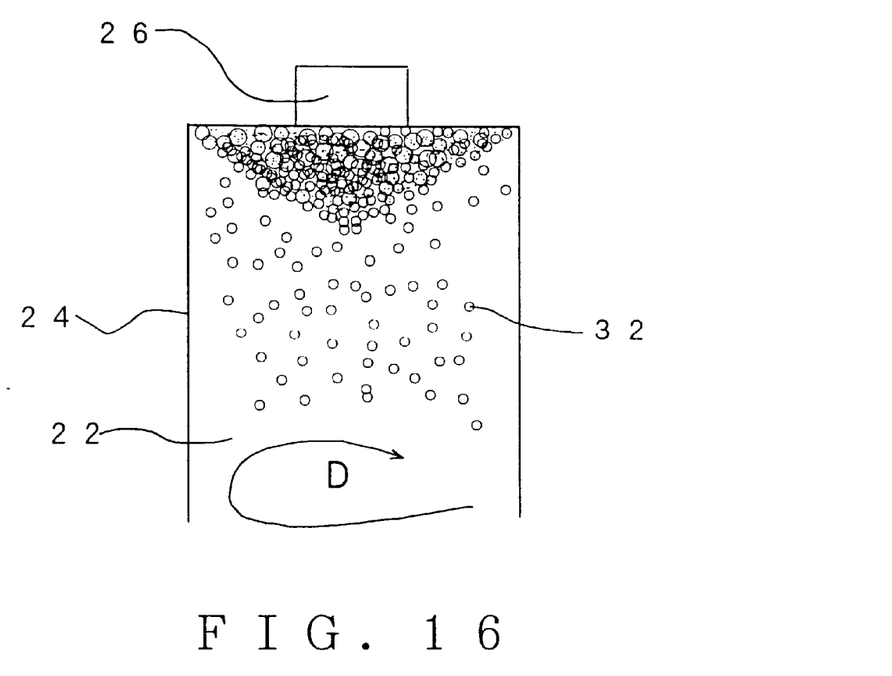
FIG. 16 is a schematic view of a cylinder with a conventional swirl in a combustion chamber with a relatively rich fuel-air mixture.
Figure 17:
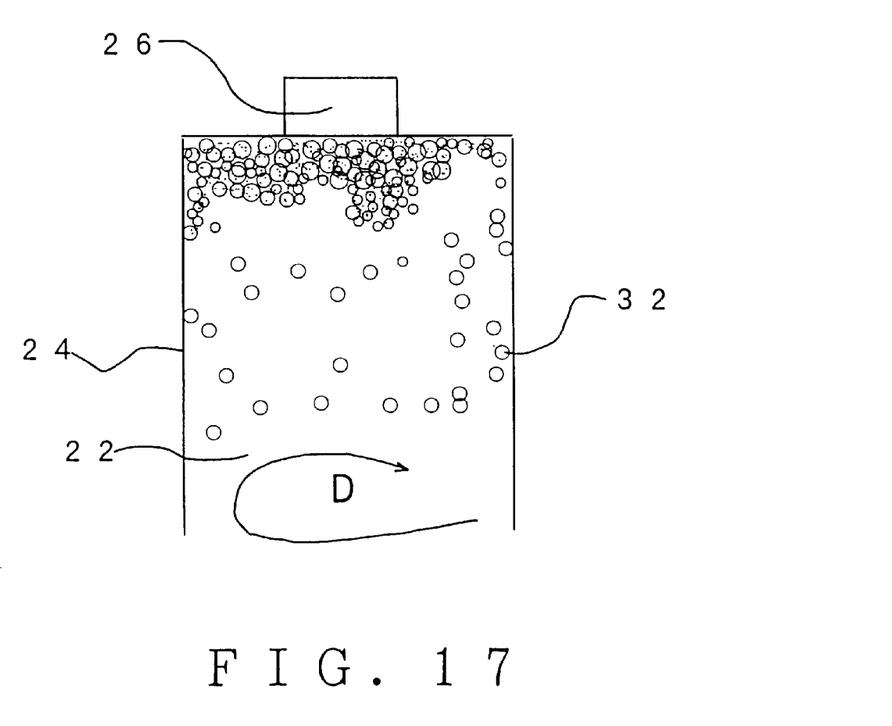
FIG. 17 is a schematic view of a cylinder with a conventional swirl in a combustion chamber with a relatively lean fuel-air mixture.
Figure 18:
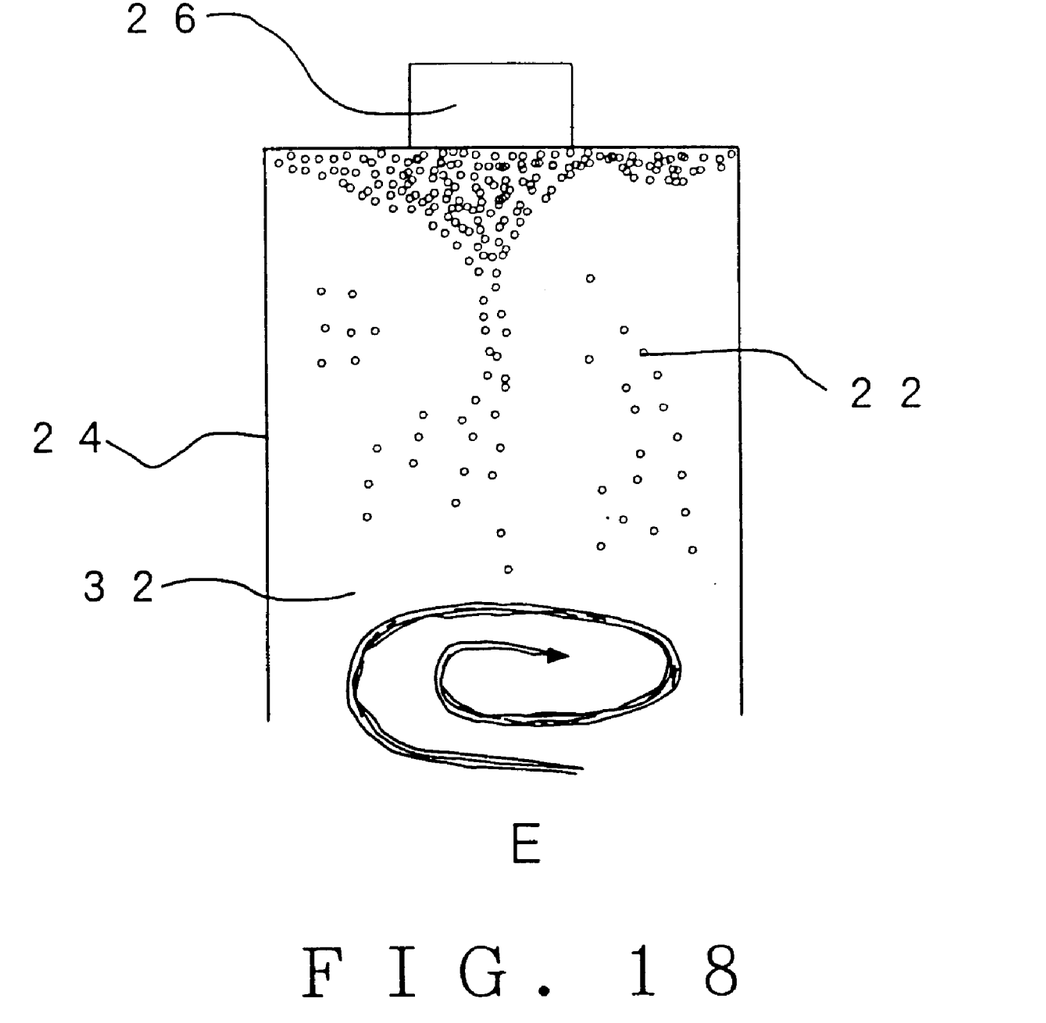
FIG. 18 is a schematic view of a cylinder with a strong swirl generated by diagonally opposing intake and exhaust ports in a combustion chamber with a relatively lean fuel-air mixture.

With reference to FIGS. 16, 17, and 18, a description of the beneficial effects of the swirl produced by the geometric positioning of the intake ports 14 and exhaust ports 16 will now be described. FIGS. 16, 17, and 18 illustrate schematically, the effects of swirling motion within the combustion chamber 24. For illustration purposes, a combustion chamber 24 includes a plurality of fuel particles 32. While fuel particles 32 do not necessarily exist within the combustion chamber 24, their use in the drawings is for illustration purposes.

FIG. 16 shows a plurality of fuel particles 32 within a combustion chamber 24 during normal operating conditions. By normal operating conditions is meant to indicate the use of a relatively rich fuel-air mixture 22. A swirl (represented by arrow D) is produced by the intake and exhaust orientations and creates a distribution gradient of fuel particles 32 within the combustion chamber 24. As seen in FIG. 16, there is a relatively high concentration of fuel particles 32 nearest the electrode terminal of spark plug 26. This high concentration advantageously aids in spark plug 26 ignition and flame propagation.

Unlike FIG. 16, FIG. 17 shows a plurality of fuel particles 32 within a combustion chamber 24 when a lean fuel-air mixture 22 is used. An identical swirl D is provided to the combustion chamber 24 as in FIG. 16. As can be readily seen, the distribution gradient of fuel particles 32 is less than that when a richer fuel-air mixture 22 is used. This is particularly true near the ignition point of the spark plug 26. Consequently, there are problems associated with fuel ignition and flame propagation.

Referring now to FIG. 18, a plurality of fuel particles 32 is shown using a lean fuel-air mixture 22. In FIG. 18, a strong swirl represented by arrow E is produced by the diagonally opposing orientation of the intake ports 14 and the exhaust ports 16. This strong swirl E advantageously concentrates the fuel particles 32, i.e., fuel-air mixture 22 near the ignition point of spark plug 26. Unlike prior designs, this strong swirl E aids in spark plug 26 ignition as well as flame propagation This results in better gas mileage and higher torque. Moreover, the results can be achieved even at high engine revolutions.

Figure 6:
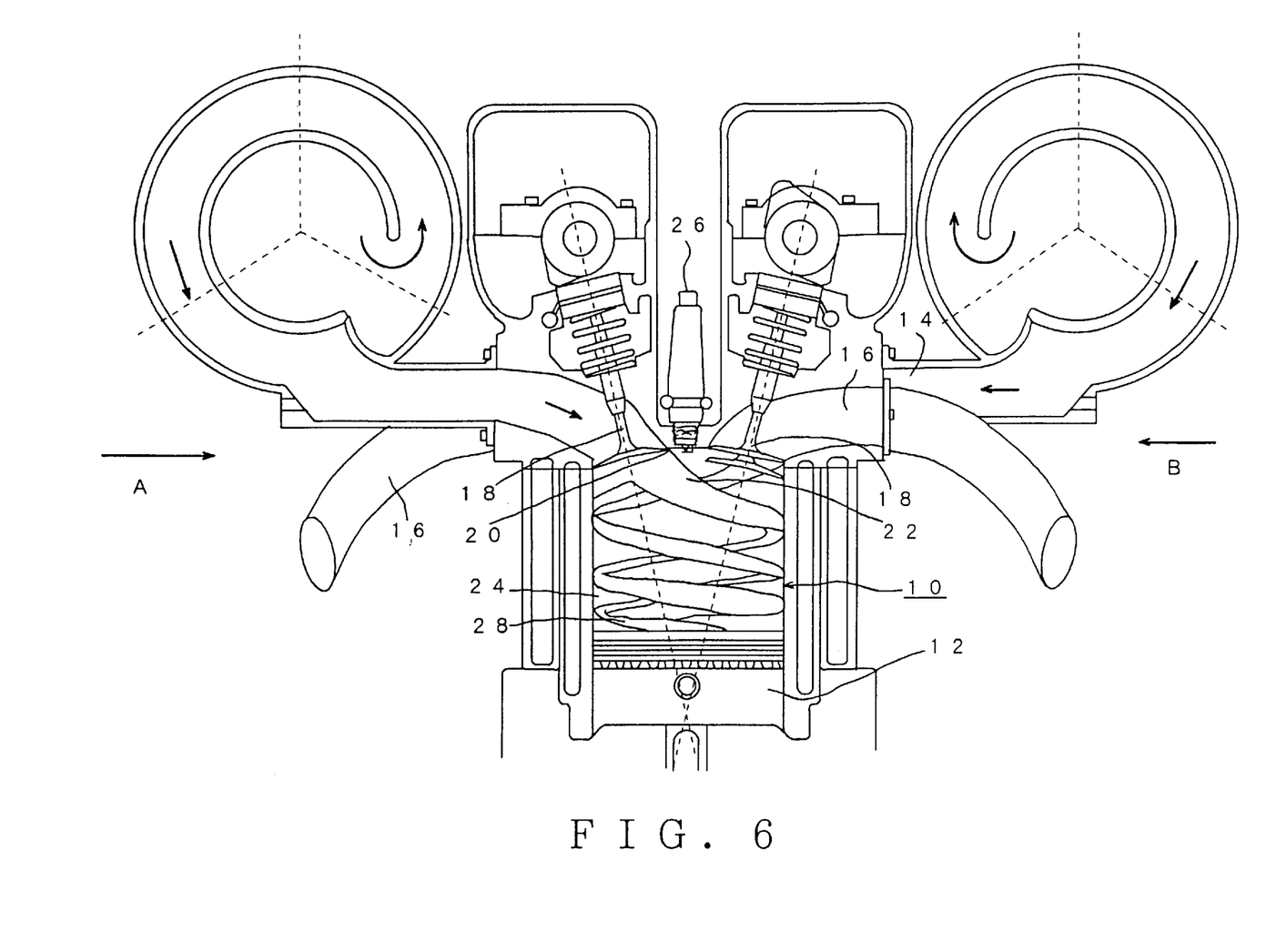
FIG. 6 is a cross-sectional view of a cylinder with intake and exhaust ports during the intake stroke.
Figure 7:
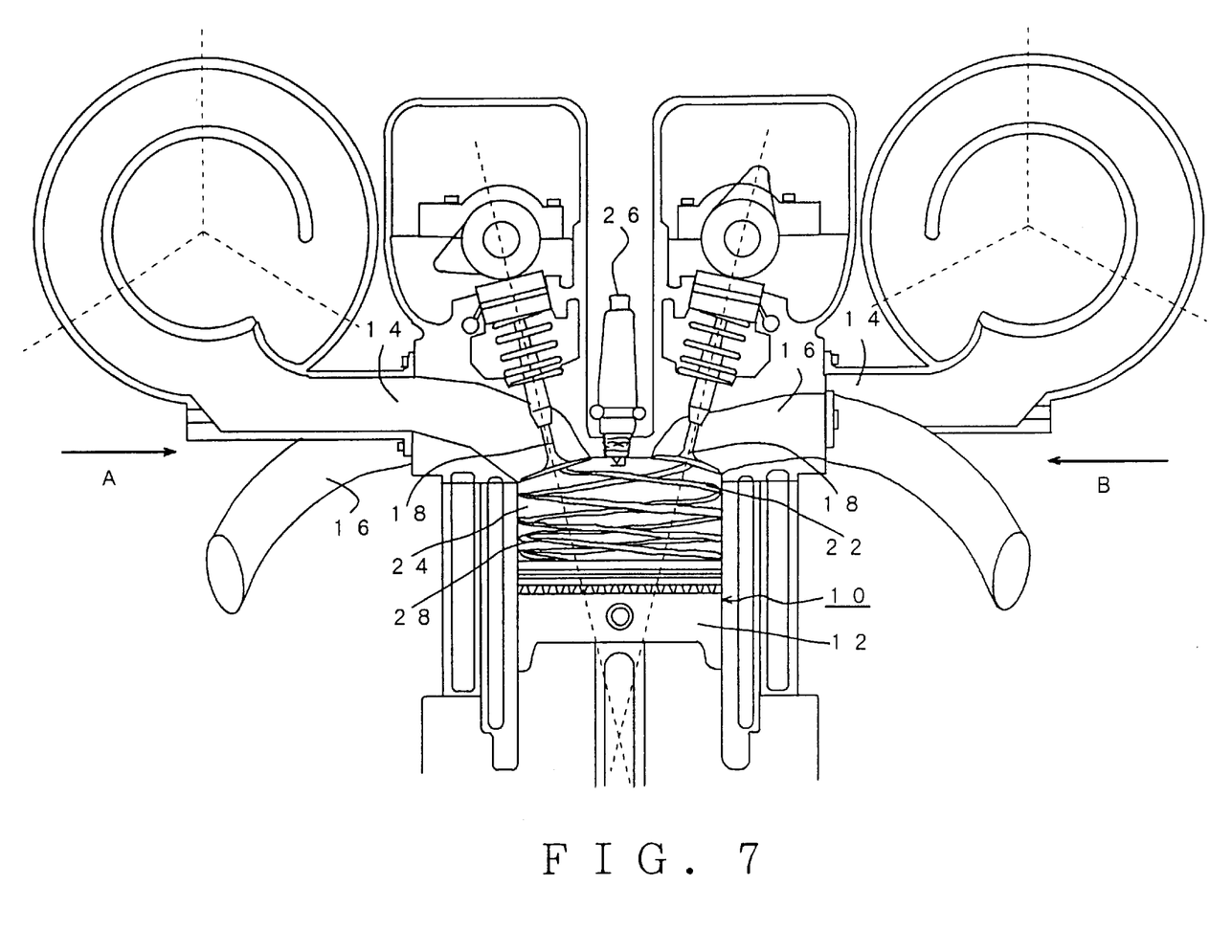
FIG. 7 is a cross-sectional view of a cylinder with intake and exhaust ports during the compression stroke.

With reference to FIGS. 5 through 12, the operation of the above-recited intake and exhaust system will now be described. As can be seen in FIGS. 5 and 6, during the intake stroke, the piston 12 moves downward within cylinder 10. During this movement, the fuel-air mixture 22 enters the combustion chamber 24 via orifices 20 created by the opening of the two intake valves 18. As is readily seen in FIG. 6, the fuel-air mixture 22 enters into the combustion chamber 24 from opposing directions. In a first intake port 14, the fuel-air mixture 22 enters into the combustion chamber 24 in the direction of arrow A. In contrast, the fuel-air mixture 22 from a second intake port 14 enters the combustion chamber 24 in the direction of the arrow B.

Due to the positioning of the two intake ports 14, a strong swirl 28 of the fuel-air mixture 22 is thus created in the combustion chamber 24. This strong swirl 28 serves to fluidize or homogenize the fuel-air mixture 22 within the combustion chamber 24. As the piston 12 moves further down in the cylinder 10, the swirling motion increases even further.

Figure 8:
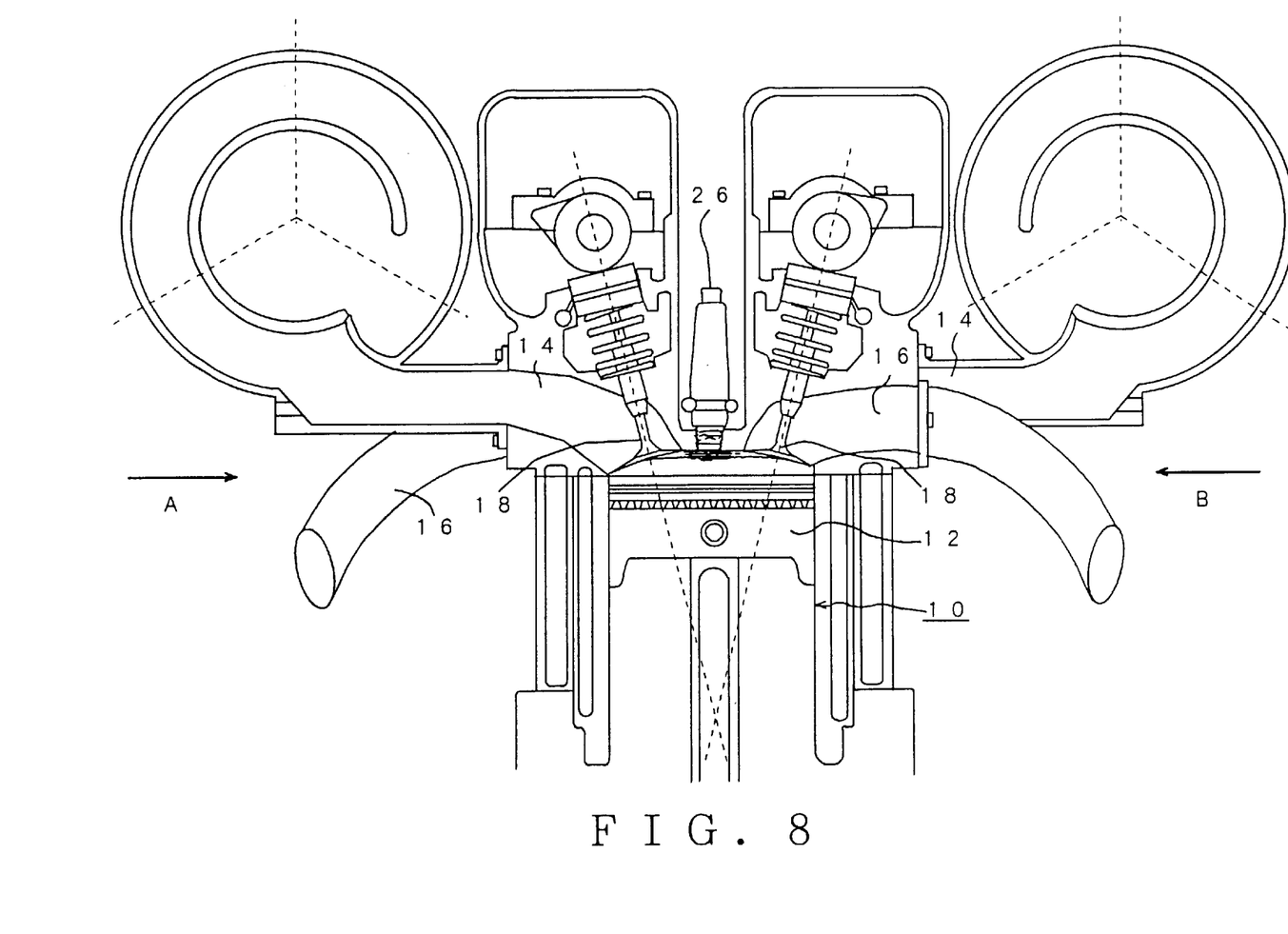
FIG. 8 is a cross-sectional view of a cylinder with intake and exhaust ports during the compression stroke illustrating the fuel-air mixture at dead-center compression.

At the termination of the intake stroke, the valves 18 for the intake ports 14 close as the piston 12 begins to move upward within the cylinder 10. (See FIGS. 7 and 8). During this compression stroke, the layers consisting of both the lean fuel-air mixture 22 and air, fluidly move with respect to one another. The compression action of the piston 12 collapses these layers, forcing the layers to intimately mix with one another. These layers also collide with the inside walls of the cylinder 10 and terminate when the piston 12 reaches the top-dead center position as shown in FIG. 8.

Figure 9:
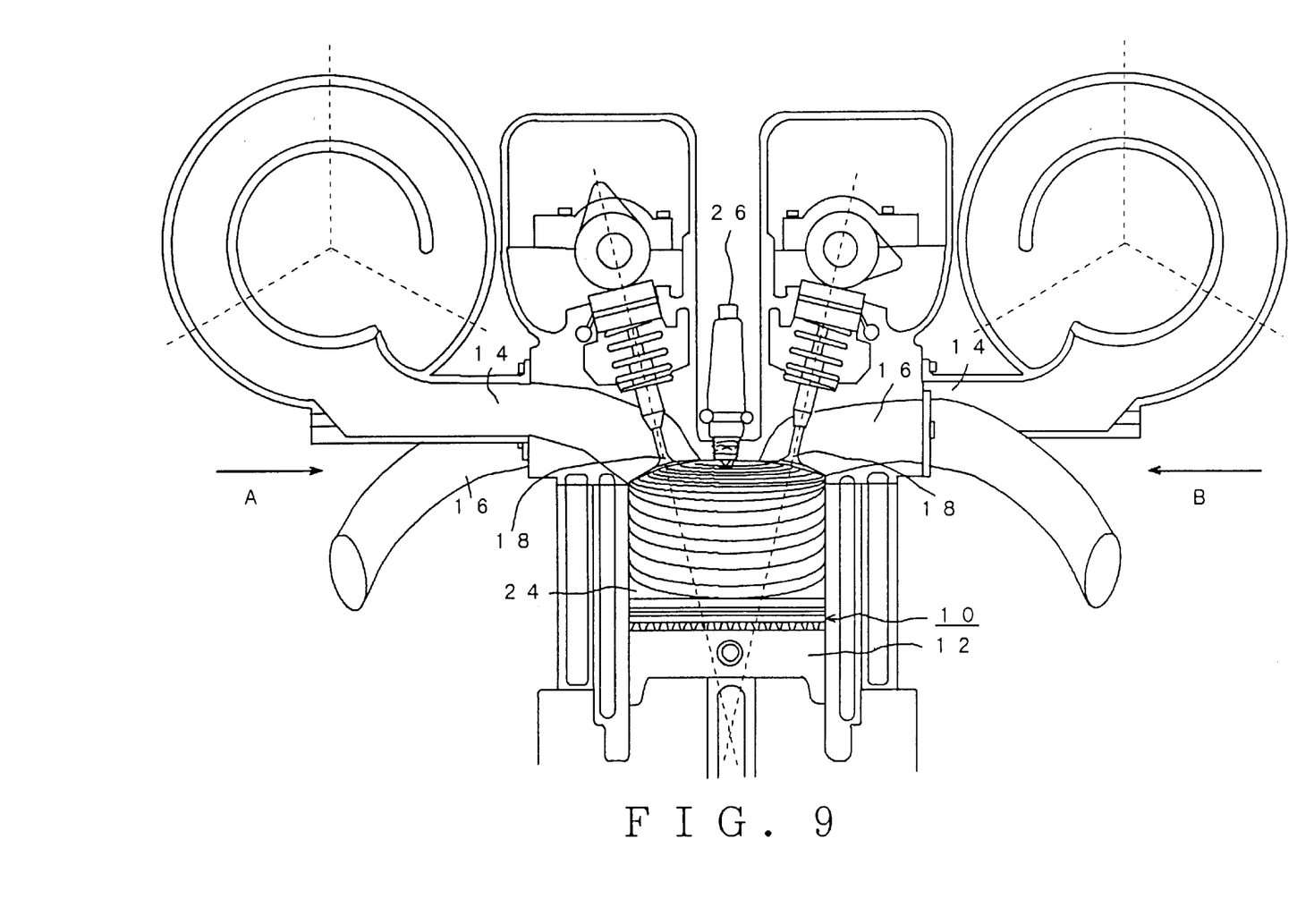
FIG. 9 is a cross-sectional view of a cylinder with intake and exhaust ports during the power stroke.

At the top-dead center position, a spark is generated by the spark plug 26, igniting the fuel-air mixture 22. The combustion caused within the combustion chamber 24 forces the piston 12 downward in the cylinder 10. As can be seen in FIG. 9, both the intake and exhaust valves 18 are completely closed during the power stroke.

Figure 10:
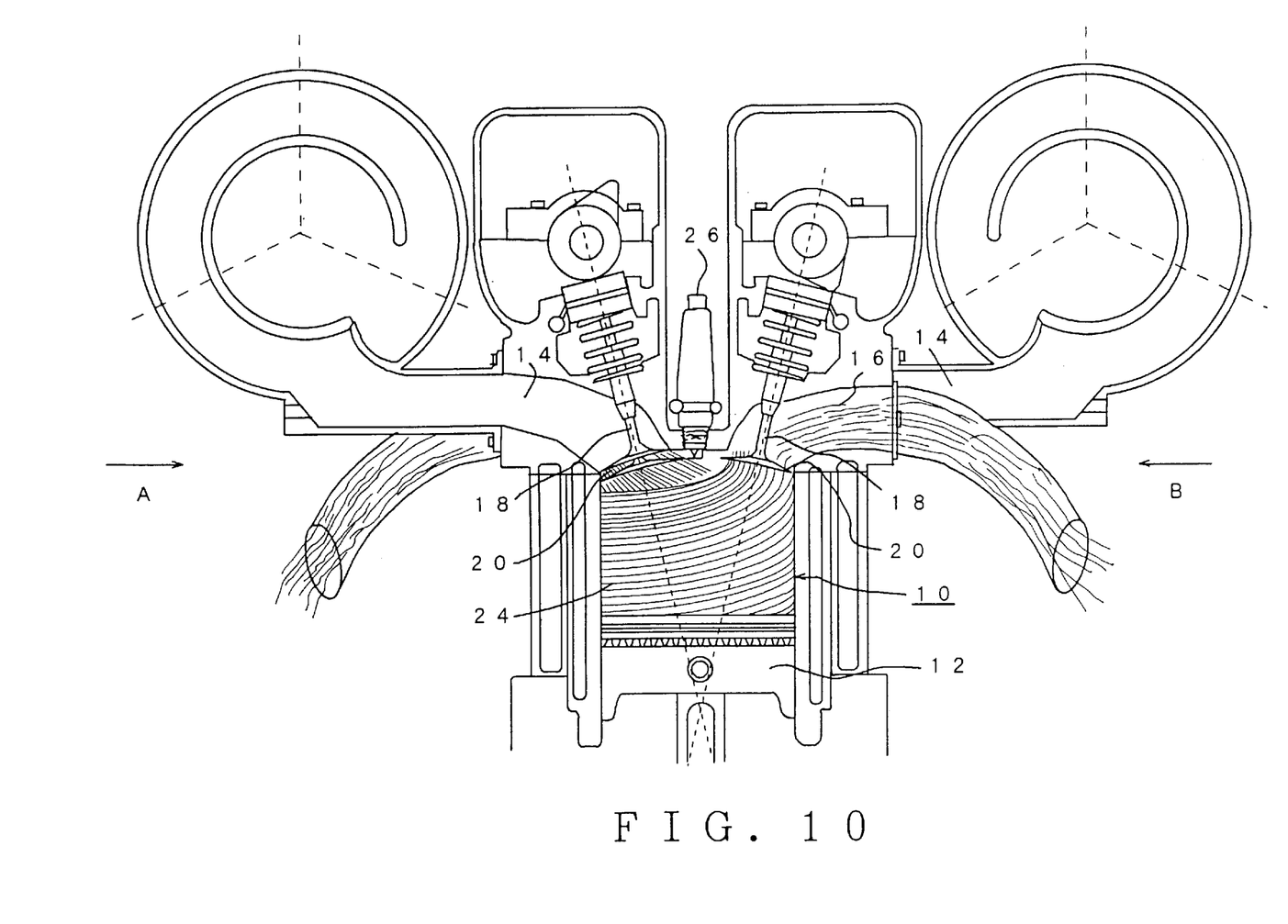
FIG. 10 is a cross-sectional view of a cylinder with intake and exhaust ports during the exhaust stroke.

FIG. 10 illustrates the termination of the power stroke and the beginning of the exhaust stroke. As can be seen from the FIG. 10, the input ports 14 are closed by their respective valves 18. However, the exhaust valves 18 for the exhaust ports 16 are opened, allowing the combustion gases to pass through the orifices 20 and into the exhaust ports 16.

Figure 11:
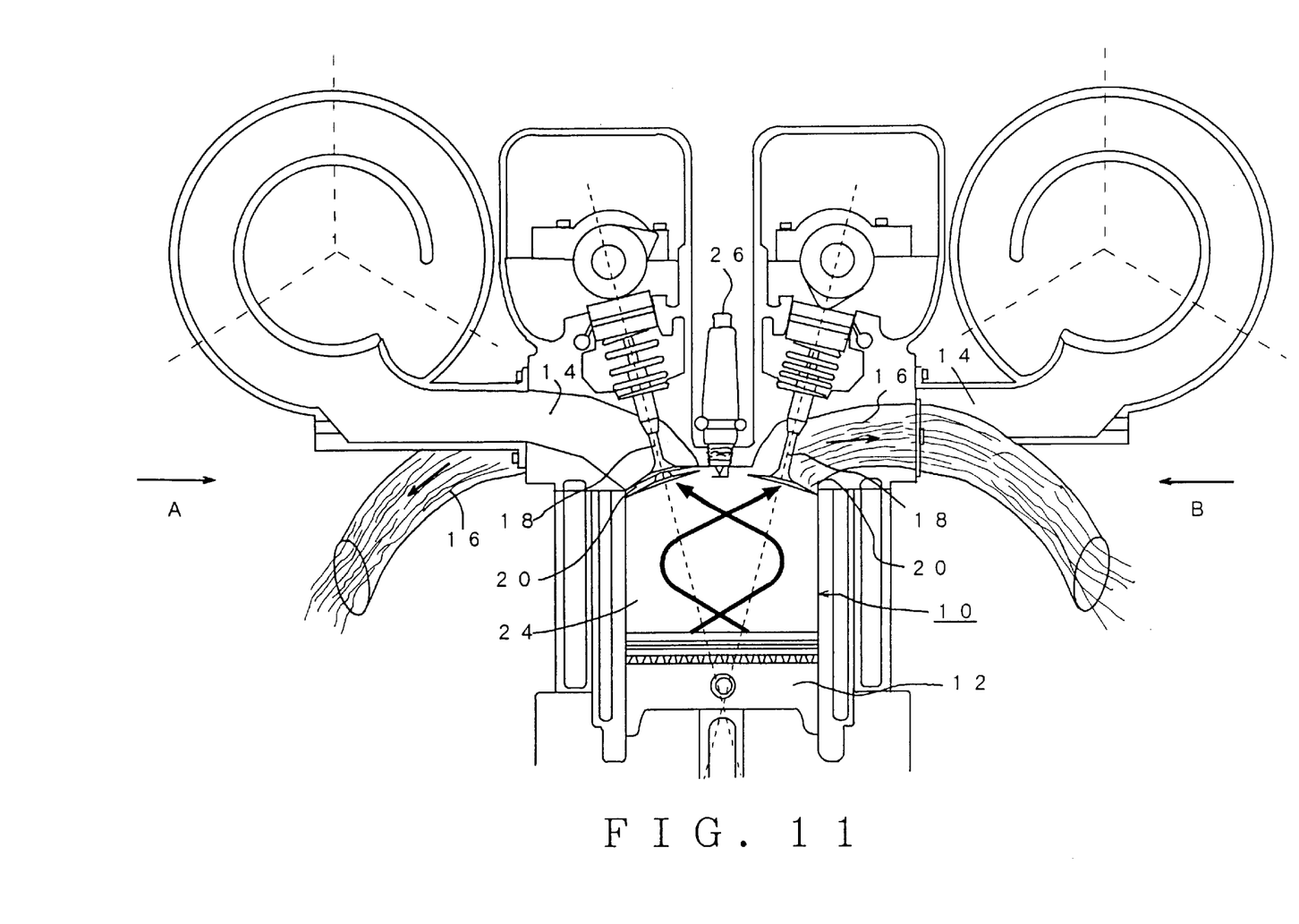
FIG. 11 is a cross-sectional view of a cylinder with intake and exhaust ports during the exhaust stroke.

Referring now to FIG. 11, when the piston 12 begins moving up into the cylinder 10, a strong swirl 28 of the combustion gases is created within the combustion chamber 24. The combustion gases are then expelled outside of the cylinder 10 via the exhaust ports 16.

As is readily seen in FIG. 11, the combustion gases exit from the combustion chamber 24 from opposing directions. In a first exhaust port 16 the combustion gases exit from the combustion chamber 24 in the direction of arrow A. In contrast, the combustion gases exit the combustion chamber 24 via a second exhaust port 16 in the direction of the arrow B.

Figure 12:
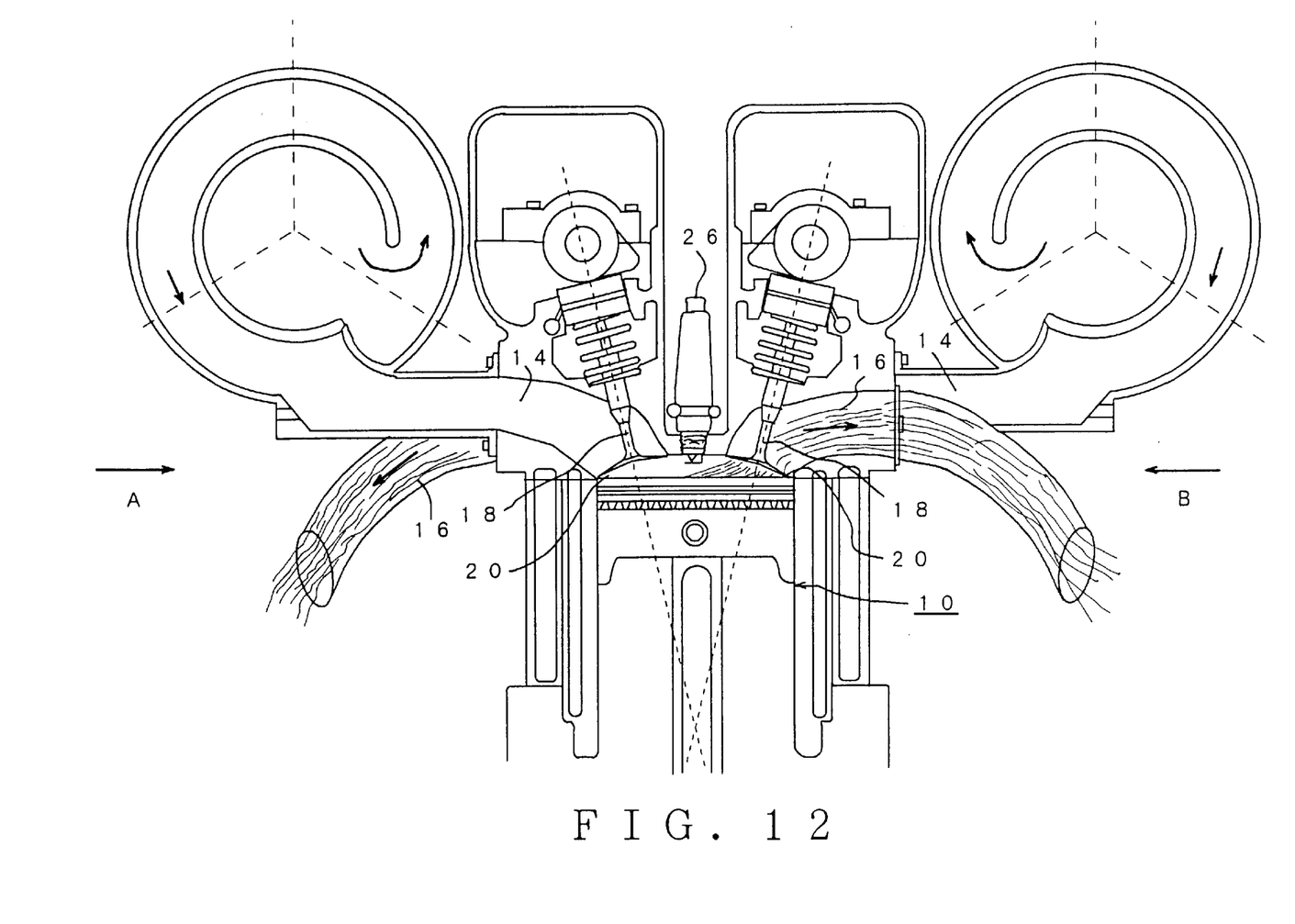
FIG. 12 is a cross-sectional view of a cylinder with intake and exhaust ports showing the transition from the exhaust stroke to the intake stroke.

Now referring to FIG. 12, a description of the transition from the exhaust stroke to the intake stroke will now be described. As the piston 12 begins nearing its minimum displacement within the cylinder 10, the valve 18 for the intake port 14 opens slightly allowing communication between the intake port 14 and the combustion chamber 24. Consequently, a small volume of fuel-air mixture 22 enters the main combustion chamber 24. The fuel-air mixture 22 entering the combustion chamber 24 not only fills the chamber for preparation for ignition, but also aids in purging the combustion chamber 24 of the residual combustion gases. Residual swirls within the combustion chamber 24 also advantageously permit the efficient discharge of combustion gases.

Figure 13:
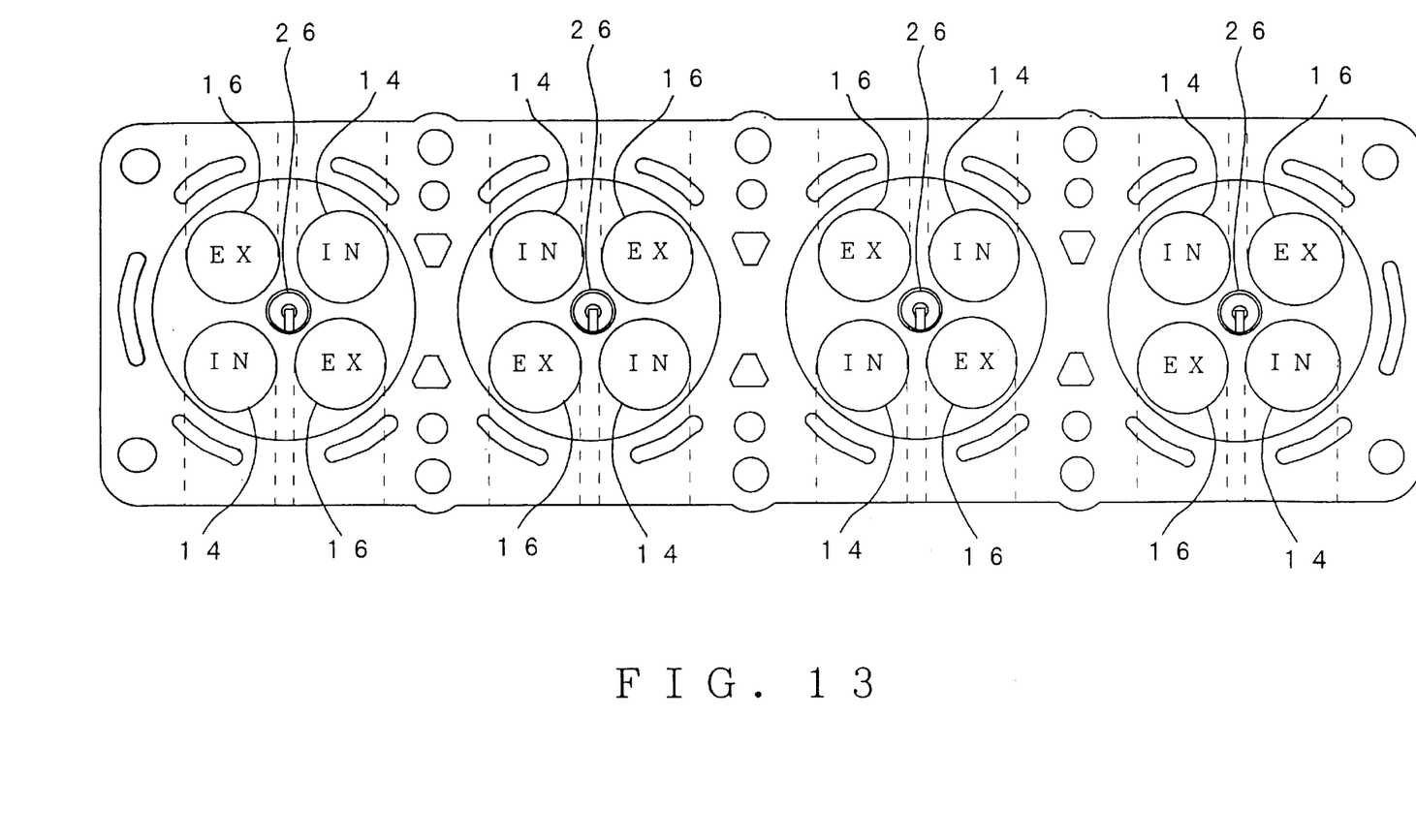
FIG. 13 is a cross-sectional view of an engine block illustrating the positioning of the intake and exhaust ports for multiple cylinders.

FIG. 13 illustrates a plurality of cylinders incorporating the intake and exhaust system of the present invention.

Thus, an improved intake and exhaust port arrangement for internal combustion engines is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A four-stroke engine comprising
   a cylinder;
   a first intake port connecting to the cylinder in a first direction, the first intake port creating a swirl within the cylinder during operation of the engine;
   a second intake port connecting to the cylinder in a second direction, directly opposite of the first direction and disposed laterally therefrom, the second intake port arranged on a diagonally opposite side of the cylinder as the first intake port, the second intake port creating a swirl within the cylinder during operation of the engine; and
   at least one exhaust port, said at least one exhaust port connecting to the cylinder in either the first or second direction.

2. An arrangement of intake and exhaust ports according to claim 1, the first and second intake ports arranged substantially symmetrical about a plane passing through the center axis of the cylinder.

3. An arrangement of intake and exhaust ports according to claim 2, the first and second intake ports arranged so as to be laterally adjacent a spark plug positioned within the center region of the cylinder.

4. An arrangement of intake and exhaust ports according to claim 1, the cylinder further containing two exhaust ports.

5. An arrangement of intake and exhaust ports according to claim 4, the two exhaust ports positioned on diagonally opposing sides of the cylinder.

6. An arrangement of intake and exhaust ports according to claim 4, the two exhaust ports arranged so as to be laterally adjacent a spark plug positioned within the center region of the cylinder.

7. A four-stroke engine comprising
   at least one cylinder;
   a first intake port connecting to the at least one cylinder in a first direction, the first intake sort creating a swirl within the cylinder during operation of the engine;
   a second intake port connecting to the at least one cylinder in a second direction, directly opposite of the first direction and disposed laterally therefrom, the second intake port diagonally opposing the first intake port, the second intake port creating a swirl within the cylinder during operation of the engine; and
   at least one exhaust port, said at least one exhaust port connecting to the cylinder in either the first or second direction.

8. An intake and exhaust system according to claim 7, the first and second intake ports arranged substantially symmetrical about a plane passing through the center axis of the cylinder.

9. An intake and exhaust system according to claim 8, the first and second intake ports arranged so as to be laterally adjacent a spark plug positioned within the center region of the cylinder.

10. An arrangement of intake and exhaust ports according to claim 7, the cylinder further containing two exhaust ports.

11. An arrangement of intake and exhaust ports according to claim 10, the two exhaust ports positioned on diagonally opposing sides of the cylinder.

12. An arrangement of intake and exhaust ports according to claim 10, the two exhaust ports arranged so as to be laterally adjacent a spark plug positioned within the center region of the cylinder.

13. A four stroke engine comprising
   a cylinder having a first intake port connecting to the cylinder, the first intake port transferring a fuel-air mixture into the cylinder in a first direction, the first intake port introducing the fuel-air mixture into the cylinder to form a swirl flow;
   a second intake port connecting to the cylinder and diagonally opposing the first intake port, the second intake port transferring the fuel-air mixture into the cylinder in a second direction that is opposite to the first direction and disposed laterally therefrom, the second intake port introducing the fuel-air mixture into the cylinder to form a swirl flow; and
   at least one exhaust port located in the at least one cylinder, said at least one exhaust port connecting to the at least one cylinder in either the first or second direction.

14. An intake and exhaust system according to claim 13, the cylinder further containing a first and a second exhaust port.

15. An intake and exhaust system according to claim 14, the first and second exhaust ports positioned on diagonally opposing sides of the cylinder.

16. An intake and exhaust system according to claim 15, the first exhaust port transferring combustion gases from the cylinder in the first direction, the second exhaust port transferring combustion gases from the cylinder in the second direction.

17. An intake and exhaust system according to claim 14, the first and second exhaust ports arranged so as to be laterally adjacent a spark plug positioned within the center region of the cylinder.

* * * * *

UNITED STATES PATENT AND TRADEMARK OFFICE
CERTIFICATE OF CORRECTION

PATENT NO. : 5,934,246
DATED : August 10, 1999
INVENTOR(S) : SATO, JUN

It is certified that error appears in the above-indentified patent and that said Letters Patent is hereby corrected as shown below:

Column 8, line 6, change "sort" to --port--.

Signed and Sealed this

Eighth Day of February, 2000

Attest:

Q. TODD DICKINSON

*Attesting Officer*                *Commissioner of Patents and Trademarks*